M. IRIYE.
WIND SHIELD CLEANER.
APPLICATION FILED DEC. 17, 1917.
1,286,594.
Patented Dec. 3, 1918.
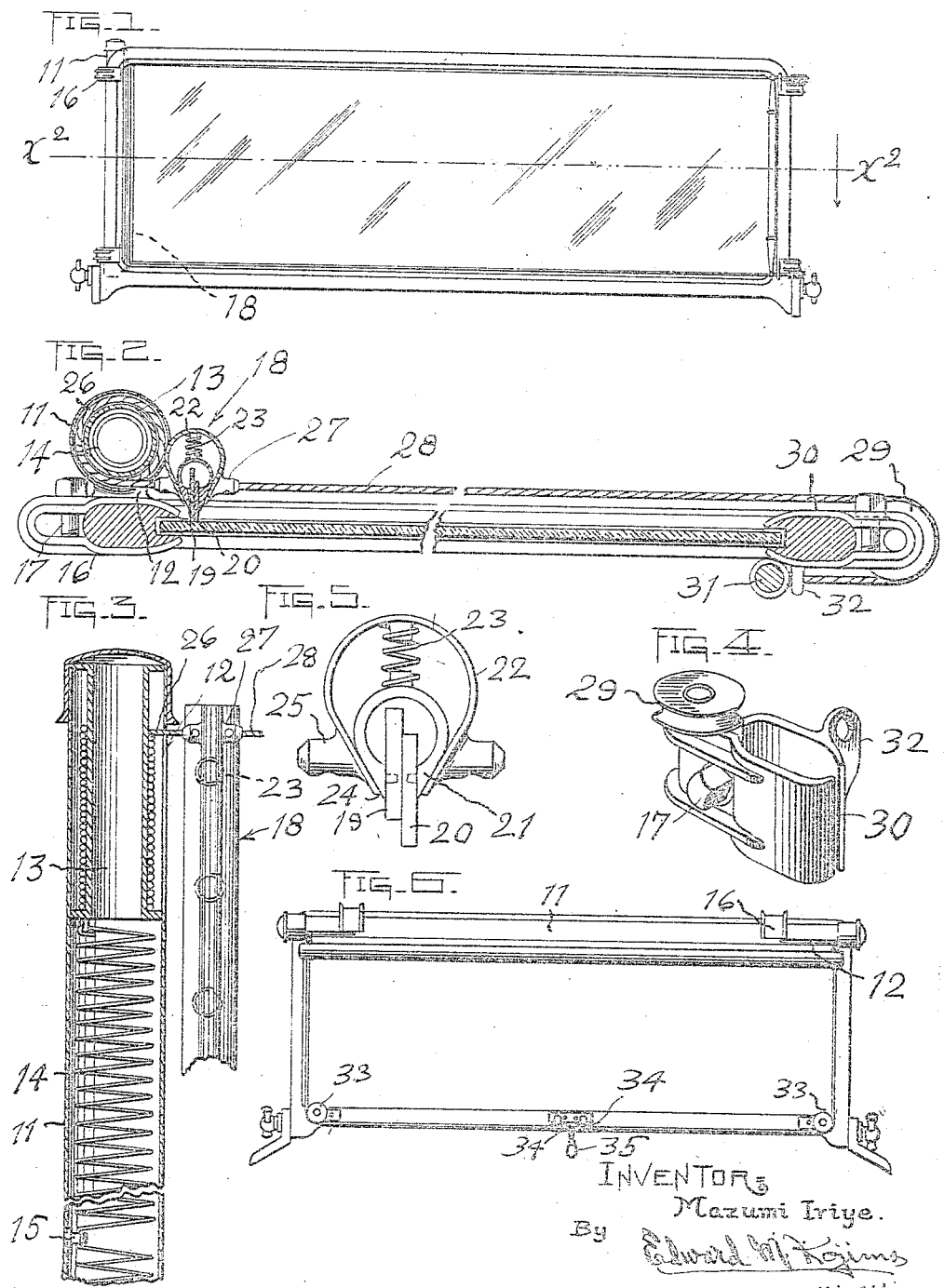
INVENTOR
Mazumi Iriye.
By Edward M. Kojima
His Atty.

UNITED STATES PATENT OFFICE.

MAZUMI IRIYE, OF LOS ANGELES, CALIFORNIA.

WIND-SHIELD CLEANER.

1,286,594.          Specification of Letters Patent.          Patented Dec. 3, 1918.

Application filed December 17, 1917. Serial No. 207,410.

*To all whom it may concern:*

Be it known that I, MAZUMI IRIYE, a subject of the Emperor of Japan, residing at Los Angeles, in the county of Los Angeles and State of California, have invented a new and useful Improvement in Wind-Shield Cleaners, of which the following is a specification.

This invention relates to an improved means for cleaning wind shields on automobiles, and every kind, class, and description of transparent closures where a clear vision is at all times desired, such as engine-cab windows, submarine periscopes, observation ports upon boats and nautical devices, and all observation instruments.

The object of the invention is to provide a simple, cheap, handy device which may be conveniently attached to wind shields and correlated devices, and as readily manipulated for cleansing the same for purposes of clear vision.

The invention comprehends essentially a spring roller, a cord extending therefrom, and a cleaner mounted upon the cord and arranged to pass over the surface of the wind shield or other device, when the cord is manipulated by the operator.

Further objects of this invention relate to improvements in the detailed parts of members of the device.

With these and other ends in view, which will readily appear as the nature of the invention is better understood, the same consists in the improved construction and novel arrangement and combination of parts, which will be hereinafter fully described, and particularly pointed out in the claims.

In the drawings, Figure 1 is a rear view of a wind shield to which my invention has been applied; Fig. 2 is a longitudinal section taken on the line X²—X², of Fig. 1; Fig. 3 is a fragmental and sectional detail view of the wiper and casing; Fig. 4 is a perspective detail view of a clamp and roller mounted thereon; Fig. 5 is an end view of the wiper; and Fig. 6 is a front elevation of a wind shield with my invention applied at the top.

Referring to the drawings, my improved device consists of the casing 11, provided on the ends with the longitudinal slots 12, and having mounted therein the bobbins 13, which are actuated by the spring 14. Spring 14 is secured at its middle portion to the lug 15, projecting inwardly from the casing. Casing 11 is clamped to one side of the wind shield, being provided with clamps 16, secured by screws 17.

I further provide a wiper 18, consisting of the flexible elements 19, 20, preferably of rubber, mounted in the inner casing member 21. The element 20 projects beyond the element 19, and is adapted to engage with the surface of the wind shield. As the wiper is drawn across the wind shield in one direction, the projecting element 20 will be supported by element 19 to more efficiently clean the surface of the wind shield. The element 20 will yield and offer less resistance upon the return movement, being unsupported to a greater extent. A resilient outer casing 22, supports the inner casing member 21, and a series of coil springs 23 are interposed between the inner casing and the inner wall of the outer casing. The members 19, 20, project through a longitudinal opening 24 in the outer casing 22, and are yieldingly supported to bear against the wind shield.

The position of the flexible elements 19, 20, relative to the member 21, is determined by the inwardly projecting pins 24. At the top and bottom of the outer casings 22, are provided lugs 25, to which are secured cords 26, said cords 26 passing through the slots in casing 11 and passing around the bobbins 13. To lugs 27, are secured cords 28, which extend across the wind shield to rollers 29, mounted on clamps 30, secured to the opposite edge of the wind shield, the rollers being thus in opposed relation to the bobbins. The opposite ends of cords 28 are secured to the manual actuating bar 31. Pierced lugs 32, through which the cords 28 pass, limit the return movement of the actuating bar.

In the modified form shown in Fig. 6, the construction of the casing, the bobbins, and the wiper, are similar. In this instance cords extending from the wiper, pass over rollers 33 and 34, and thence to the rear of the wind shield. An actuating ball 35 is provided for manually operating the device.

In the use of either of the forms shown, the operator grasps the actuating bar or ball, as the case may be, and pulls thereon, this causing the wiper to be drawn over the surface of the wind shield. The actuating bar may be drawn in any direction as the position of the wiper is determined by the supports at either end of the wind shield. Upon release of the actuating bar by the operator, the wiper is instantly retracted to normal position by the spring element and bobbins within the casing 11.

From the foregoing it may be seen that I have provided a wind shield cleaner of the simplest nature, the apparatus shown being capable of many modifications and for application to various devices.

What is claimed is:

1. In a wind shield cleaner, the combination with a casing adapted to be mounted on the edge of a wind shield, of rotatable bobbins mounted in the ends of the casing, a coil spring within the casing having each end secured to a bobbin and the central portion secured to the casing, a wiper without the casing, cords attached to the wiper, said cords winding around said bobbins, and means for manually drawing the wiper across the surface to be cleaned.

2. In a wind shield cleaner, a wiper comprising two elastic strips one of which is arranged to project beyond the other, an inner casing to hold said strips, and an outer resilient casing to hold said inner casing, a series of coil springs interposed between the inner casing and the inner side of said outer casing, and means to move the wiper to and fro across the surface to be cleaned.

3. In a wind shield cleaner, a wiper comprising flexible strips, one projecting beyond the other to offer less resistance against movement in one direction, an inner casing to hold the strips, an outer resilient casing to hold the inner casing, a series of coiled springs interposed between the inner casing and the inner wall of the outer casing, means for manually actuating the wiper against the greater resistance, and spring actuated means to retract the wiper to normal position.

4. In a wind shield cleaner, a casing, independently revoluble bobbins mounted within the casing, a coil spring to actuate the bobbins, a wiper adapted to be moved across the surface to be cleaned, means for clamping the bobbin casing to one edge of the wind shield, rollers adapted to be clamped to the opposite edge of the wind shield, cords extending from the wiper over said rollers, a transverse bar connected to the ends of said cords, and other cords extending from the wiper over said bobbins.

In testimony whereof I hereunto affix my signature this 30th day of November, 1917.

MAZUMI IRIYE.

Witnesses:
F. M. KEENEY
J. M. MASTER.